No. 720,770. PATENTED FEB. 17, 1903.
C. E. YEAGER.
SEED PLANTER.
APPLICATION FILED JAN. 27, 1902. RENEWED JAN. 15, 1903.
NO MODEL. 2 SHEETS—SHEET 1.

Inventor
Charles E. Yeager,

Witnesses

No. 720,770. PATENTED FEB. 17, 1903.
C. E. YEAGER.
SEED PLANTER.
APPLICATION FILED JAN. 27, 1902. RENEWED JAN. 15, 1903.
NO MODEL. 2 SHEETS—SHEET 2.

Witnesses
F. L. Ourand
J. Albillson

Inventor,
Charles E. Yeager.
By H. B. Willson & Co
Attorneys

UNITED STATES PATENT OFFICE.

CHARLES E. YEAGER, OF PRAIRIE CREEK, INDIANA.

SEED-PLANTER.

SPECIFICATION forming part of Letters Patent No. 720,770, dated February 17, 1903.

Application filed January 27, 1902. Renewed January 15, 1903. Serial No. 139,227. (No model.)

*To all whom it may concern:*

Be it known that I, CHARLES E. YEAGER, a citizen of the United States, residing at Prairie Creek, in the county of Vigo and State of Indiana, have invented certain new and useful Improvements in Seed-Planters; and I do declare the following to be a full, clear, and exact description of the invention, such as will enable others skilled in the art to which it appertains to make and use the same.

The invention relates to seed-planters, and more especially to that class of planters designed to replant seed during the course of cultivation at those points where the seed formerly planted fails to grow, and thus is in the nature of a replanter particularly designed for replanting corn.

The object of the invention is to provide a device of this character which may be readily attached to any of the well-known forms of straddle-row cultivators now in general use and by means of which hills may be replanted during the course of the cultivation of the young plants.

With this and other objects in view the invention consists of certain novel features of construction, combination, and arrangement of parts, which will be hereinafter more fully described, and particularly pointed out in the appended claims.

Figure 1:
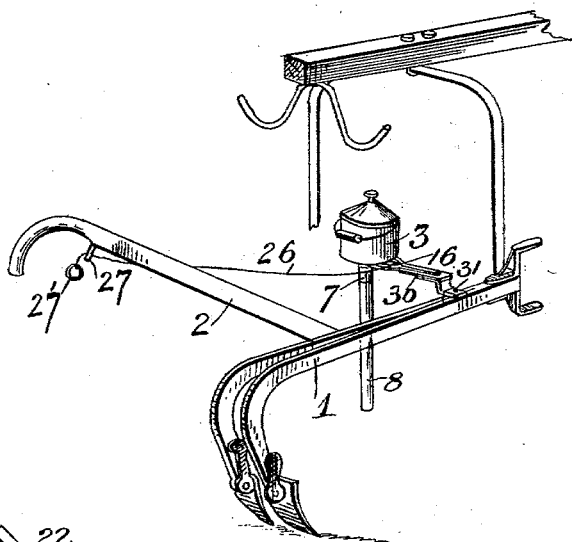
Figure 5:
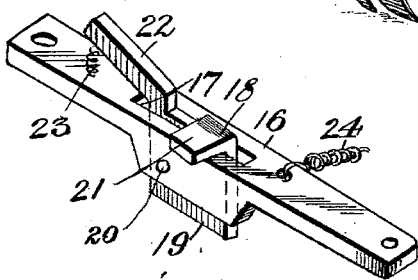
Figure 4:
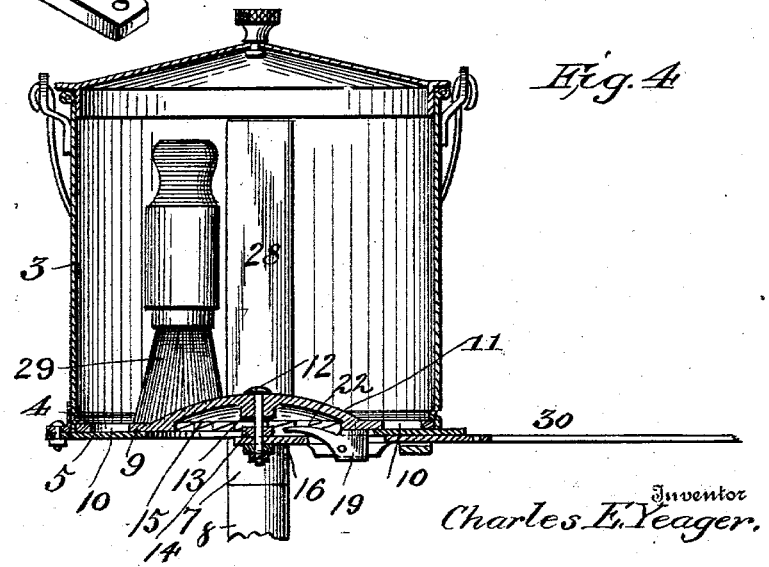
Figure 3:
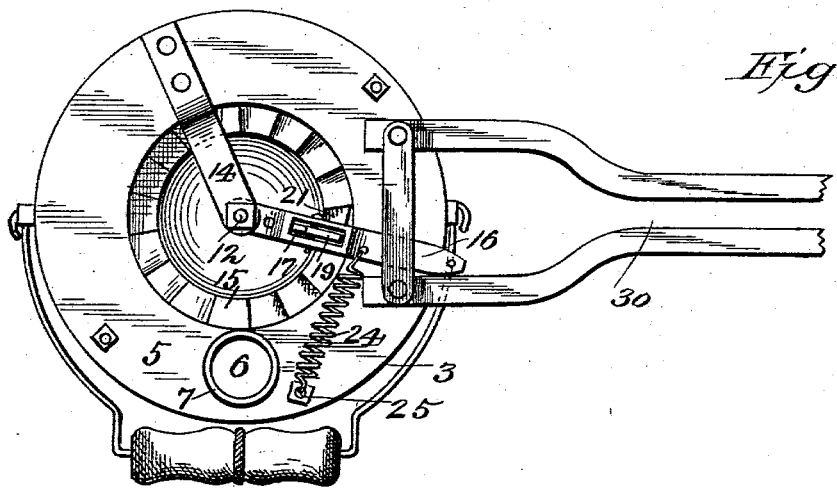
Figure 2:
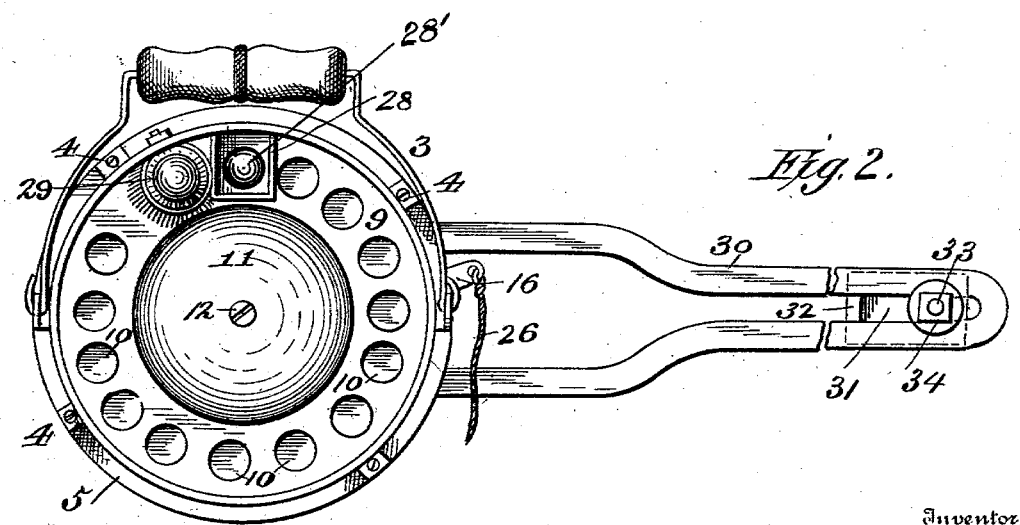

In the accompanying drawings, Figure 1 is a perspective view of a fragment of a cultivator, illustrating the cultivator-beam, the handle, and the replanter secured to the beam. Fig. 2 is a top plan view of the replanter with the cover removed. Fig. 3 is a bottom plan view. Fig. 4 is a vertical sectional view, and Fig. 5 is a detail perspective view, of the ratchet.

Referring to the drawings, 1 denotes a cultivator-beam, 2 the handle secured thereto, and 3 the hopper of the replanter. The bottom of this hopper is open and is provided with lips 4, to which is bolted an annular flange 5, which projects inwardly and reduces the opening in the bottom of the hopper. Formed in the flange 5 is a seed-discharge aperture 6, surrounded by a nipple 7, to which is secured a seed-discharge tube 8.

9 denotes a seed-disk having an annular row of apertures 10, which are adapted to be brought successively into register with the seed-discharge aperture and is formed with a raised bottom 11, which is journaled by a bolt 12, projecting downwardly from a boss 13, formed in the seed-disk, to a bifurcated bar 14, fixed to the under side of the flange. The lower side of the seed-disk is formed with an annular row of ratchet-teeth 15.

16 denotes a lever pivoted between the bifurcated ends of the bar upon the bolt 12 and provided with a longitudinal slot 17.

18 denotes an angular ratchet, having an extension 19, projecting into the slot of the lever and pivoted therein by a bolt 20. The working end 21 of the ratchet is adapted to engage the ratchet-teeth 15, while the extended inner end 22 is adapted to be of sufficient weight to hold the working end into engagement with said ratchet-teeth. To augment this, however, a spring 23 may be provided.

24 denotes a stiff coil-spring connected to the lever and to a fixed point 25 of the hopper-bottom and serves to return the ratchet and actuating-lever to their normal positions after they have been moved in the act of advancing the seed-disk the distance of one tooth. Any suitable means may be employed for actuating this lever, preferably a fine wire 26, connected to said lever and passing through a screw-eye 27, adjacent to the handgrip of the cultivator-handle. A finger of the operator is adapted to pass through a ring 27', secured to the end of the wire, and during is observed the operator by drawing upon the the course of cultivation when a barren hill wire will supply the hill with seed.

Immediately over the discharge-aperture and located within the hopper is a tube 28, under which successively pass the apertures in the seed-disk. Arranged within this tube 28 is a spherical body 28', which is of such diameter as to permit a portion of its surface to project through the apertures in the seed-disk and thus should any seed tend to cling in said apertures force them out therefrom, so that they may freely discharge through the seed-discharge tube.

Located within the hopper and in advance of the seed-discharge opening therein is a fixed brush 29, which tends to regulate the amount of seed carried by the apertures of the seed-disk under the tube 28. This brush, in other words, prevents the seed from heaping in said apertures, and thereby but a predetermined number allowed to be carried under the tube 28.

Any suitable means may be employed for attaching the hopper to the cultivator-beam. As shown, a slotted arm 30 is bolted to the under side of the hopper and is secured to a bracket 31, bolted to the cultivator-beam. The attachment of the arm to the bracket may be effected in any suitable manner, preferably adjustably. In this event the bracket may be provided with a lip 32, which projects up into the slot, and a bolt 33 may pass through an aperture formed in the bracket and through the slot of the arm and be clamped in place by a nut 34. Any other suitable means, however, may be provided for securing this adjustment.

I consider it a very important feature of the present invention that the ratchet is provided with an extension which projects through the slot of the pivoted lever, as this extension takes all strain off the pivot which connects the ratchet with the lever, and thereby reduces the liability of the parts getting out of order.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a seed-planter of the character described, the combination with a hopper provided with a seed-discharge orifice; of a seed-disk journaled in the bottom of the hopper and provided with apertures adapted to be successively brought into register with the seed-discharge orifice, said seed-disk being provided with ratchet-teeth on its lower side, a spring-actuated pivoted lever having a slot intermediate its ends, a ratchet having a downward extension pivoted to the wall of said slot, an extension projecting laterally across the lever and adapted to engage the ratchet-teeth, an inward extension, a spring for exerting an upward pressure against the inward extension, and means for actuating the lever to rotate the seed-disk tooth by tooth, substantially as and for the purpose specified.

2. In a seed-planter of the character described, the combination with a hopper, of a bracket adapted to be secured to the cultivator-beam and provided with a vertically-extending lip, a slotted arm secured to said hopper and through the slot of which projects the lip, a bolt projecting through said bracket and the slot of said arm, and a nut to engage upon the end of said bolt for clamping the arm adjustably to the bracket, substantially as set forth.

In testimony whereof I have hereunto set my hand in presence of two subscribing witnesses.

CHARLES E. YEAGER.

Witnesses:
T. L. TRUEBLOOD,
W. B. CATON.